May 30, 1967 M. L. FALK 3,323,078

TRANSISTORIZED BOUNCE COMPENSATED REMOTE VARIABLE GAIN CONTROL

Filed May 1, 1964 2 Sheets-Sheet 1

INVENTOR
MERVIN L. FALK

BY James H. Griffin
ATTORNEY

INVENTOR
MERVIN L. FALK
BY James H. Griffin
ATTORNEY

United States Patent Office 3,323,078

Patented May 30, 1967

3,323,078

TRANSISTORIZED BOUNCE COMPENSATED REMOTE VARIABLE GAIN CONTROL

Mervin L. Falk, Sunnyvale, Calif., assignor to Ampex Corporation, Redwood City, Calif., a corporation of California Filed May 1, 1964, Ser. No. 364,205

7 Claims. (Cl. 332—31)

This invention relates in general to circuitry for processing electronic signals and especially to a transistorized circuit useable for the remote control of signal gain and for the maintenance of optimum signal level.

Applicant's variable gain control (VGC) circuit will be described in the environment of a magnetic tape recorder for recording television signals, but it is to be understood that the principle of the invention may be applied to television, radio, servomechanisms, and many other systems where the range of operating levels or the gain of the system are sought to be controlled by other than direct manual devices. In the past, gain control has usually been accomplished by coupling the signal to be controlled to a manually variable resistor mounted just behind the control panel of the electronic device involved. Thus, in a television tape recorder, the video signal was conducted through one long line into the variable resistor and thence through another long line back to the next circuit component involved in its processing.

The longer the lines coming and going, of course, the greater the sensitivity to all the various external disturbances that can degrade any electrical signal; so it became highly desirable to devise some means for varying the gain of the video signal in place, as near to the preceding and succeeding stages in the video playback system as possible. Several methods have been tried, one of the early ones being a motor-operated variable resistor that could be remotely controlled from the panel of the tape recorder. Such a motorized potentiometer system, however, is bulky, heavy, and slow in response. Moreover, the necessity for accurate timing of the motor and gear reduction makes such a component quite expensive.

Various vacuum tube methods of VGC are available, but due to tube size and specialized power requirements, vacuum tubes are practically ruled out for any otherwise transistorized circuit. Another possibility is the so-called "Raysistor" (a Raytheon Co. trade name) a lightbulb in combination with a light sensitive variable resistance diode. Remote control of the degree of the illumination of the lightbulb varies the resistance of the diode and thus the gain of a signal passing through. Raysistor units have, however, proved unsatisfactory in operation: they are slow in response and very temperature unstable, exhibiting a temperature drift that is intolerable for some applications. Their behavior changes with age; yet the circuit in which they are used must be very carefully adjusted and designed to maintain operation along a very small portion of the diode curve, for the diode, of course, has an exponential transfer characteristic. As operation gets into the more nonlinear portions of the diode curve, amplitude distortion of the signal occurs.

It is, therefore, a general object of this invention to provide an improved variable gain control circuit.

Another object is to provide a remote gain control system that does not require the transmission of the signal being controlled all the way to some point on the control panel and back again.

Another object of this invention is to provide a gain control circuit that is able to compensate for "bounce"—the momentary change in D.C. operating level of the circuit following each change of circuit gain.

Another object of this invention is to provide a transistorized variable control circuit which is temperature-stable, linear in response, and does not contain components which exhibit deteriorating performance due to aging or variation of operating point.

In the achievement of the above objects and as a feature of applicant's invention there is utilized the variable input impedance of a common base transistor amplifier, which is a function of the D.C. current in the emitter. Variation of this D.C. current varies the gain of the amplifier over a large range with a low distortion. If two common base transistor amplifiers have their input electrodes (emitters) connected in parallel and if these emitters are coupled to a relatively high impedance signal source, then the signal current divides according to the ratio of the input impedances of the two common base transistor amplifiers. By varying the D.C. bias voltage at the base of one of the amplifiers, the current division can be caused to vary differentially between the two amplifiers, thus varying the signal gain on the output electrode (collector) of each.

As another feature of applicant's invention, the two differential gain control transistors mentioned above are fed from a relatively high impedance signal source, so that variations of the input impedance of these transistors have no effect on the total signal current flowing to the junction point preceding the emitter. Thus full signal current will be divided between the amplifiers at all points throughout the range of their operation, and minimum distortion of output signals will occur due to a variation of the total input impedance presented by the differential amplifier.

As another feature of applicant's invention, for the purposes of compensating for "bounce," two additional transistor amplifiers are provided with the collector of each being coupled to the collector of one of the gain control differential amplifiers. The variable bias voltage applied to the base of one of the differential amplifiers is also applied to the base of one of the "bounce" compensating amplifiers, so that the change in control signal that causes "bounce" in the differential amplifier causes an opposing "bounce" in the compensating amplifiers which cancels out "bounce" components in the output signal of applicant's circuit.

Other objects and features of applicant's invention and a fuller understanding thereof may be had by referring to the following description and claims taken in conjunction with the accompanying drawings, in which:

Figure 1:
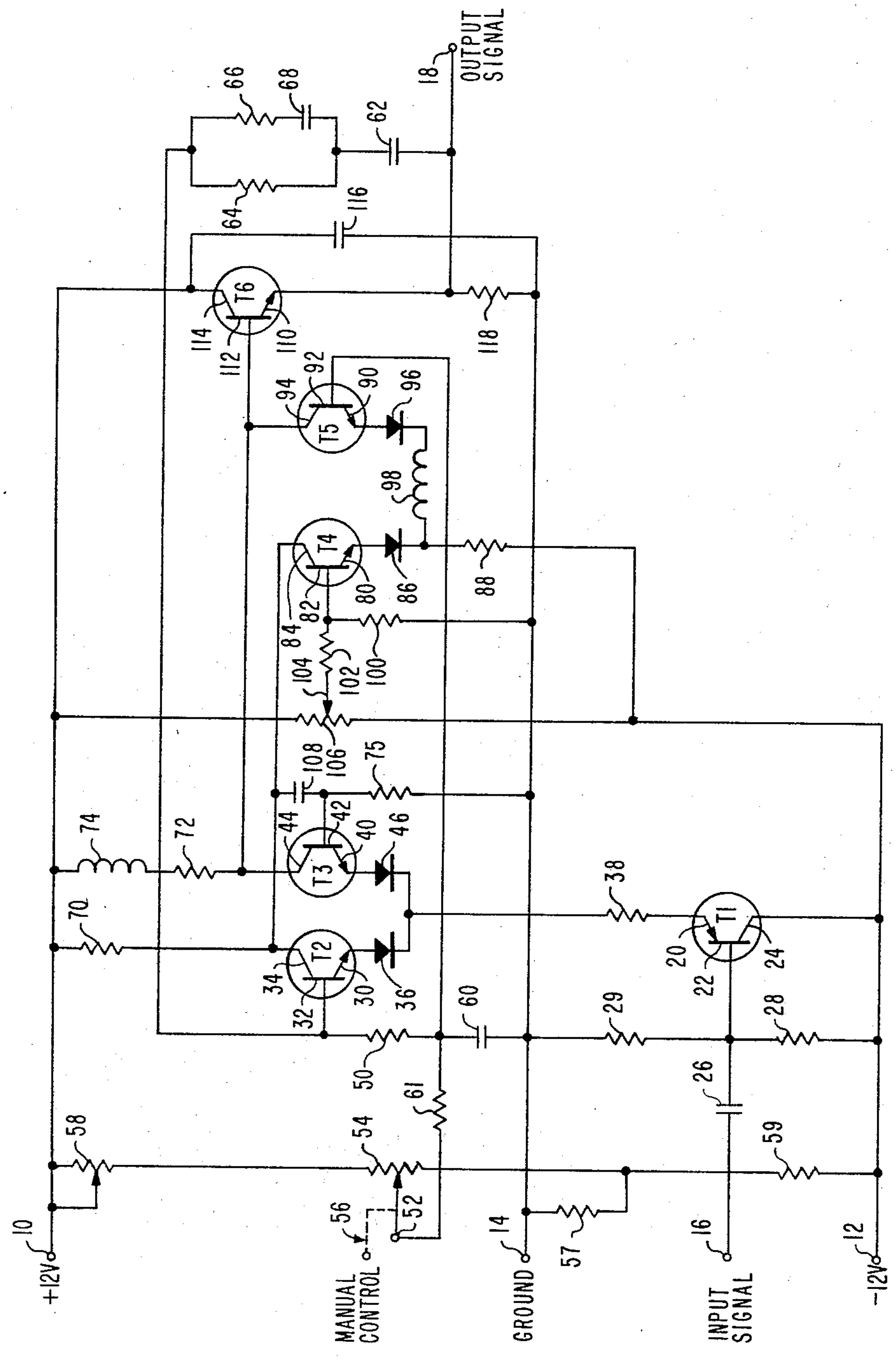
FIGURE 1 shows schematically a preferred embodiment of applicant's invention.

Referring to FIGURE 1, the circuit which is a preferred embodiment of the principles of applicant's invention has power supply terminals 10 and 12, a ground terminal 14, an input terminal 16, and an output terminal 18. For purposes of illustration, the power supplies 10 and 12 are specified as +12 volts and −12 volts, respectively.

A transistor T1, having emitter 20, base 22, and collector 24, has its base 22 coupled through a capacitor 26 to the input terminal 16. The base 22 is also coupled to the power supply 12 through a resistor 28 and to ground 14 through a resistor 29. The collector 24 of the transistor T1 is directly coupled to the power supply 12.

Two transistors T2 and T3 have emitters 30, 40, bases 32, 42, and collectors 34, 44, respectively. The emitter 30 of the transistor T2 is coupled through a diode 36 and a resistor 38 to the emitter 20 of the transistor T1. The emitter 40 of the transistor T3 is coupled through a diode 46 to the junction between the diode 36 and the resistor 38.

The base 32 of the transistor T2 is coupled through a resistor 50 to a wiper 52 on a variable resistor 54, which (as an object of this invention) can be located a great distance from the rest of the circuitry in the drawing. The wiper 52 may be varied by any conventional type of manual control, represented at 56. The variable resistor 54 is coupled to ground through a resistor 57, to the power supply 10 through a variable resistor 58, and to the power supply 12 through a resistor 59. The wiper 52 is coupled to ground through a low pass filter comprising a capacitor 60 and a resistor 61; this filter is placed at the far end of the often-lengthy line between the wiper 52 and the base 32 to decouple line noise, hum, clicks, and other spurious signals.

The base 32 of the transistor T2 is coupled to the output terminal 18 through a network made up of a capacitor 62 in series with the parallel combination of a resistor 64 and a resistor 66 and capacitor 68 in series. The collector 34 of the transistor T2 is coupled to the power supply 10 through a resistor 70. The collector 44 of the transistor T3 is coupled to the power supply 10 through the series combination of a resistor 72 and inductor 74.

Two transistors T4 and T5 have emitters 80, 90, bases 82, 92, and collectors 84, 94, respectively. The emitter 80 is coupled through a diode 86 and resistor 88 to the power supply 12. The emitter 90 is coupled through a diode 96 and an inductor 98 in series to the junction point between the diode 86 and the resistor 88. The base 82 of the transistor T4 is coupled through a resistor 100 to ground 14 and through a resistor 102 to a wiper 104 on a variable resistor 106, connected between the power supply 10 and the power supply 12. The collector 84 of the transistor T4 is directly coupled to the collector 34 of the transistor T2 and is coupled through a capacitor 108 to the base 42 of the transistor T3. The collector 94 of the transistor T5 is directly coupled to the collector 44 of the transistor T3, and the base 92 is directly coupled to the wiper 52 of the variable resistor 54.

A transistor T6, having emitter 110, base 112, and collector 114, has its base 112 directly coupled to the collectors 44, 94 of the transistor T3, T5. The collector 114 of the transistor T6 is directly coupled to the power supply 10 and through a decoupling capacitor 116 to ground 14. The emitter 110 of the transistor T6 is coupled to ground 14 through a resistor 118 and is directly coupled to the power supply 18.

Figure 2:
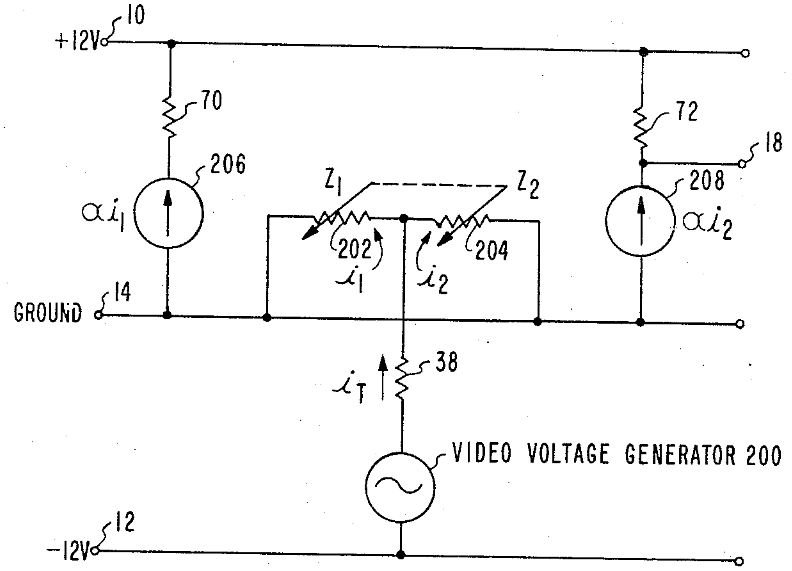
FIGURE 2 illustrates applicant's inventive principle by the use of equivalent circuits.

FIGURE 2 illustrates by the use of an equivalent circuit the variable gain control principle employed in the circuit illustrated in FIGURE 1. The components in FIGURE 1 between the input terminal 16 and the transistor T1 are summarized by a video voltage generator 200 coupled between the power supply 12 and the resistor 38. The combined impedances of the diode 36 and the emitter 30 of the transistor T2, shown in FIGURE 1, are replaced by a variable impedance 202. In like manner, the impedances of the emitter 40 of the transistor T3 and the diode 46 are replaced by a variable impedance 204. The current-forcing or high impedance effect of the collector 34 is simulated by a current generator 206, discharging through the resistor 70 to the power supply 10 and the current output of the collector 44 is simulated by a current generator 208 discharging through the resistor 72 to the power supply 10.

The resistor 38 is many times larger than the impedances 202 and 204, so that current flow out of the video voltage generator 200 is substantially unaffected by variation in resistance beyond the resistor 38. The current flow through the resistor 38, $i_t$, must divide at the junction between the impedances 202 and 204 and the resistor 38 into $i_1$ flowing through the impedance 202 and $i_2$ flowing through the impedance 204. The relative proportions of $i_1$ and $i_2$ will depend upon the relative values of the impedances 202 and 204.

The outputs of the current generators 206 and 208 are directly proportional to the instantaneous values of their input currents $i_1$ and $i_2$. Thus, the output of the current generator 206 is some factor $\alpha$ (the grounded base current gain of the particular transistor used) times the current $i_1$; the output of the current generator 208 is $\alpha$ times the current $i_2$. The voltages across the resistors 70 and 72 will depend, of course, on the instantaneous values of $\alpha i_1$ and $\alpha i_2$, respectively. The voltage drop across the resistor 72 will appear at the output terminal 18. Thus, variation of the impedances 202 and 204 will divide the current $i_t$ in any proportion from $(i_1=i_t, i_2=0)$ to $(i_1=0, i_2=i_t)$; and the gain of the circuit will vary accordingly all the way from 0 to $\alpha(R72/R38)$.

In the operation of the preferred circuit shown schematically in FIGURE 1, the video input signal at the terminal 16 is coupled to the base 22 of the transistor T1 through the D.C. blocking capacitor 26. The transistor T1, being in the emitter-follower configuration, couples a low impedance with the circuitry forward of the input terminal 16 and yet shows great output impedance to the circuit elements operating beyond its emitter 20. Thus, the transistor T1 can force a current through its emitter 20 that is minimally effected by any changes in resistance beyond the resistor 38.

The current from the emitter 20 of the transistor T1, shown as $i_t$ in FIGURE 2, divides to flow into the emitters 30, 40 of the transistors T2, T3 (currents $i_1$ and $i_2$ in FIGURE 2). The proportion of $i_t$ flowing into each emitter 30 or 40 will depend upon the input impedances of each transistor T2 or T3, respectively, and of each diode, 36 and 46, respectively. The input impedance of each transistor-diode combination is, of course, dependent upon the bias voltages and on the D.C. currents flowing as a result thereof. The bias of the transistor T2 is varied by movement of the wiper 52 of the variable resistor 54, a variation ranging all the way from cutoff of the transistor T2 to full conduction when T3 is cut off. When the transistor T2 is cut off, all of $i_t$ would flow through the transistor T3, thus causing a maximum signal to appear at its collector 44. When the transistor T2 is saturated, no part of the current $i_t$ would flow through the transistor T3 and no signal would appear on its collector 44. Thus, manual control of the wiper 52 of the variable resistor 54 permits signal gain variation all the way from 0 through to the total gain of the transistor T3.

The collector 44 of the transistor T3 is directly coupled to the base 112 of the emitter-follower transistor T6. The emitter 110 of the transistor T6 is directly coupled to the output terminal 18. The transistor T6 serves to minimize loading on the collector 44 of the transistor T3, while at the same time ensuring that the output impedance of applicant's circuit is sufficiently low. Thus, the signal appearing on the collector 44 of the transistor T3 is essentially the output signal of the circuit shown schematically in FIGURE 1.

Figure 3:
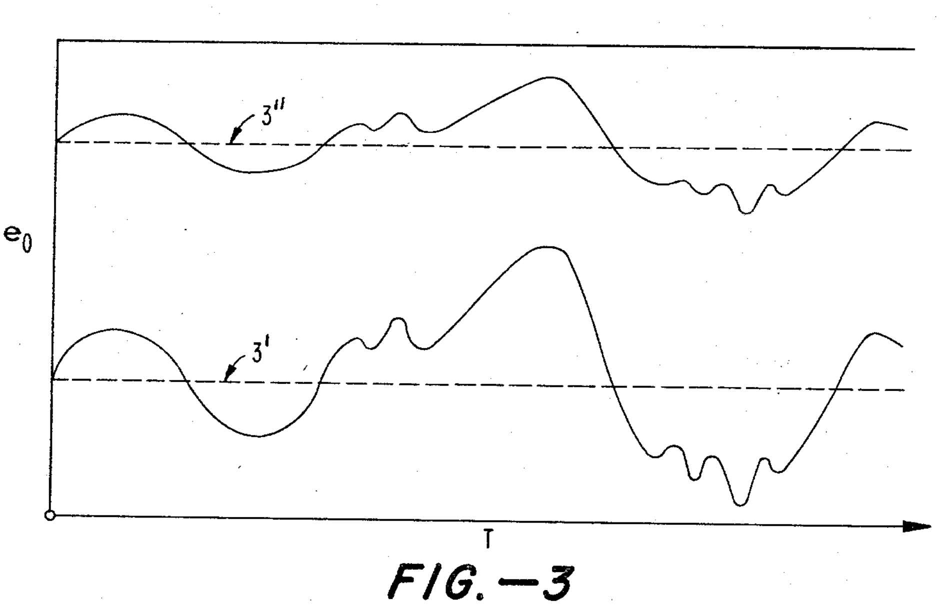
FIGURE 3 sets forth illustrative waveforms to show the effect of varying D.C. levels ("bounce") which one part of applicant's preferred circuit is designed to counteract.

The D.C. operating currents flowing through the resistors 70 and 72 should be substantially the same at all times, lest the output on the collector 44 rise above the operating levels of the circuit elements beyond the output terminal 18. Unfortunately, however, when the manual control 56 makes changes in the position of the wiper 52, the level of the D.C. currents through the resistors 70 and 72 would be temporarily changed, were it not for the compensation provided by the transistors T4 and T5 and their associated circuitry. A fast rise in D.C. voltage accompanying a rapid change in the gain control may produce a sudden change in the D.C. level of a video signal, which becomes "bounce" after it has passed through coupling capacitors. "Bounce" is a video term which indicates a bounce in brightness on a TV monitor; its effect on the output voltage is shown in FIGURE 3. The dotted line 3′ in FIGURE 3 represents the design operating level for the signal $e_0$ appearing on the collector 44. The dotted line 3″ represents a shift in operating level caused by increased D.C. current through the resistor 72.

To eliminate operating current jumps caused by manipulation of the gain control wiper 52, the transistors T4 and T5 have been connected to share D.C. operating currents with the transistors T2 and T3, respectively. Thus, the collector 84 of the transistor T4 is directly coupled to the collector 34 of the transistor T2, and the collector 94 of the transistor T5 is directly coupled to the collector 44 of the transistor T3. A movement of the wiper 52 that causes any increase in current through the transistor T2 causes a similar increase in current through the transistor T5. Since an increase in current through the transistor T2 necessitates a decrease in current through the transistor T3 (because the current through the resistor 38 and emitter 20 is not affected by conditions in the transistors T2 and T3), the increase in current through the transistor T5 will essentially equal the decrease in current through the transistor T3, leaving the operating current through the load resistor 72 approximately the same.

As with the resistor 38, so with the resistor 88, changes in conditions in the transistors T4 and T5 do not affect the current flow through the resistor due to its much larger impedance. Therefore an increase in current through the transistor T5 necessitates a decrease in current through the transistor T4, and, just as the transistor T5 balances operating currents with the transistor T3, so the transistor T4 balances operating currents of the transistor T2. The overall effect is to hold applicant's circuit down to the operating level 3′ shown in FIGURE 3, which is the design level of the circuitry beyond the output terminal 18.

Applicant's circuit illustrated in FIGURE 1 contains various elements designed to provide feedback and compensation in certain frequency ranges. The capacitor 108 and the resistor 75 are of such value as to assure low frequency stability. The inductor 74 is inserted to give higher impedances between the collector 44 and the power supply 10 at higher frequencies, thus compensating the shunt capacitances of the transistors at the higher frequencies. The inductor 98 serves to isolate the transistor T4 and circuit elements beyond it from the collector 44 of the transistor T3. The arrangement including the capacitors 62 and 68 and the resistors 64 and 66 coupled between the output terminal 18 and the base 32 of the transistor T2 provides positive feedback at increasing frequencies, thus giving added emphasis to the higher frequency output signals (6 to 10 megacycles). This network also maintains good differential phase and differential gain characteristics over the operating range of the circuit.

A variable gain control circuit in accordance with the above description and drawing was built and operated using the following components.

| | |
|---|---|
| Voltages (volts D.C.): | |
| **10** | +12 |
| **12** | −12 |
| Transistors: | |
| T1 | 2N865 |
| T2 | 2N706A |
| T3 | 2N706A |
| T4 | 2N706A |
| T5 | 2N706A |
| T6 | 2N706A |
| Diodes: | |
| **36** | FD1004 |
| **46** | FD1004 |
| **86** | FD1004 |
| **96** | FD1004 |
| Resistors (ohms): | |
| **28** | 15K |
| **29** | 62K |
| **38** | 680 |
| **50** | 10 |
| **54** | 5000 |
| **57** | 1000 |
| **58** | 10K |
| **59** | 4700 |

| | |
|---|---|
| Resistors (ohms):—Continued | |
| **61** | 150 |
| **64** | 1000 |
| **66** | 680 |
| **70** | 750 |
| **72** | 750 |
| **75** | 9.1 |
| **88** | 1K |
| **100** | 20 |
| **102** | 2000 |
| **106** | 5000 |
| Capacitors (microfarads): | |
| **26** | 150 |
| **60** | 300 |
| **62** | 150 |
| **68** | $22\times10^{-6}$ |
| **108** | 150 |
| **116** | 47 |
| Inductors (microhenries): | |
| **74** | 3.3 |
| **98** | 10 |

The circuit specified above handled signal levels of more than two volts peak-to-peak over a wide range of frequencies with very low distortion or change in output signal operating level. Thus, applicant has provided a sensitive high performance remote control circuit which eliminates the need for running long signal lines to and from a manual control point distant from the circuitry. The long signal lines heretofore used have been replaced by the connection between the wiper 52 and the resistor 50, which need only bear a D.C. signal.

It should be noted that the principle of applicant's invention may be usefully applied by being incorporated into a wide variety of feedback loops for the purpose of maintaining a constant output level signal. In such a situation, the control signal might be applied to the input terminal 16 of the circuit specifically described above, while the feedback components would replace the variable resistor 54 in supplying a bias signal to the variable impedance. Likewise, with a little further alteration and the removal of most of the decoupling components, a circuit according to applicant's invention could serve as an amplitude modulator.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A bounce compensating variable gain control circuit comprising: first and second active elements each having input, control, and output electrodes, third and fourth active elements each having input, control, and output electrodes, the output electrode of the third active element being coupled to the output electrode of the first active element, the output electrode of the fourth active element being coupled to the output electrode of the second active element, a source of variable control signals operatively coupled to the control electrodes of the first active element and the fourth active element, a source of reference potential coupled to the control electrodes of said second and third active elements, bias means coupled to the output electrodes of said first, second, third, and fourth active elements and to the input electrodes of said third and fourth active elements to bias same for conduction in accordance with said variable control signals, and an input signal source operatively coupled to the input electrodes of the first active element and the second active element.

2. A variable gain control circuit comprising: an input terminal, first and second transistors each having an emitter, base, and collector, the emitter of the first transistor being coupled through a first diode to the input terminal, the emitter of the second transistor being coupled through a second diode to the input terminal, the base of the first transistor being coupled to the wiper of a variable resistor, a bias source coupled across said variable resistor, said bias source coupled to the collectors of said first and second transistors, a reference potential source coupled to the base of said second transistor, and a filter coupled between the wiper of said variable resistor and ground.

3. A variable gain control circuit comprising: first and second transistors each having an emitter, base, and collector, the base of the first transistor being coupled to the wiper of a variable resistor, third and fourth transistors each having emitter, base, and collector, the collector of the third transistor being coupled to the collector of the first transistor, the collector of the fourth transistor being coupled to the collector of the second transistor, the base of the fourth transistor being coupled to the wiper of the variable resistor. an input signal terminal coupled to the emitters of said first and second transistors, an output terminal coupled to the collectors of said second and fourth transistors, a bias supply coupled across said variable resistor, said bias supply coupled to the collectors of said first, second, third, and fourth transistors and to the emitters of said third and fourth transistors, and means coupled to the bases of said second and third transistors to establish reference potentials thereat.

4. A variable gain control circuit comprising: a first transistor having emitter, base, and collector, the emitter of the first transistor being coupled to a first resistor, the base of the first transistor being coupled to an input signal terminal, a bias source connected to the collector of said first transistor, second and third transistors each having an emitter, base, and collector, the emitter of the second transistor being coupled through a first diode to the first resistor, the emitter of the third transistor being coupled through a second diode to the first resistor, the base of the second transistor being coupled to the wiper of a variable resistor, said variable resistor coupled across said bias source, fourth and fifth transistors each having emitter, base, and collector, the collector of the fourth transistor being coupled to the collector of the second transistor and to said bias source, the collector of the fifth transistor being coupled to the collector of the third transistor and to said bias source, the base of the fifth transistor being coupled to the wiper of the variable resistor, a third diode coupled to the emitter of the fourth transistor, a fourth diode coupled to the emitter of the fifth transistor, the third and fourth diodes being joined together, a second bias source of opposite polarity to said first bias source, a second resistor coupling to a junction point between the third and fourth diodes to said second bias source, means coupled to the bases of said third and fourth transistors to establish reference potentials thereat, and an output terminal coupled to the collectors of said third and fifth transistors.

5. A variable gain control circuit having an input terminal, an output terminal, positive and negative power supplies, a first transistor having emitter, base, and collector, the emitter of the first transistor being coupled to a first resistor, the base of the first transistor being coupled to said input terminal, the collector of the first transistor being connected to the negative power supply, second and third transistors each having an emitter, base, and collector, the emitter of the second transistor being coupled through a first diode to the first resistor, the emitter of the third transistor being coupled through a second diode to the first resistor, the collector of the second transistor being coupled through a second resistor to the positive power supply, the collector of the third transistor being coupled through a third resistor and a first inductor in series to the positive power supply, the base of the second transistor being coupled through a fourth resistor to the wiper of a variable resistor coupled between the positive and negative power supply, fourth and fifth transistors each having emitter, base, and collector, the base of the fifth transistor being coupled to the wiper of the variable resistor, the collector of the fourth transistor being coupled to the collector of the second transistor, and the collector of the fifth transistor being coupled to the collector of the third transistor, a third diode coupled to the emitter of the fourth transistor, a fourth diode coupled to the emitter of the fifth transistor, a second inductor coupled between the third and fourth diodes, a fifth resistor coupled between the third diode and the negative power supply, a sixth transistor having emitter, base, and collector, the collector of the sixth transistor being directly coupled to the positive power supply, the emitter of the sixth transistor being directly coupled to the output terminal and the base of the sixth transistor being directly coupled to the collectors of the third and fifth transistors, and means coupled to the bases of said third and fourth transistors to establish reference potentials thereat.

6. A variable gain control circuit having an input terminal, a positive power supply terminal, a negative power supply terminal, a ground terminal, an output terminal, a first transistor having emitter, base, and collector, the collector of the first transistor being directly coupled to the negative power supply terminal, the base of the first transistor being coupled through a first resistor to the negative power supply terminal and through a first capacitor to the input terminal, and the emitter of the first transistor being coupled to a second resistor, second and third transistors each having an emitter, base, and collector, the emitter of the second transistor being coupled through a first diode to the second resistor, the emitter of the third transistor being coupled through a second diode to the second resistor, the collector of the second transistor being coupled through a third resistor to the positive power supply terminal, the collector of the third transistor being coupled through a fourth resistor and a first inductor in series to the positive power supply terminal, the base of the second transistor being coupled through a fifth resistor to the wiper of a variable resistor coupled between the positive and negative power supply terminals, fourth and fifth transistors each having emitter, base, and collector, the base of the fifth transistor being coupled to the wiper of the variable resistor, the collector of the fourth transistor being coupled to the collector of the second transistor, the base of the fourth transistor being coupled to the wiper of a second variable resistor coupled between the positive and negative power supply terminals, and the collector of the fifth transistor being coupled to the collector of the third transistor, a third diode coupled to the emitter of the fourth transistor, a fourth diode coupled to the emitter of the fifth transistor, a second inductor coupled between the third and fourth diodes, a sixth resistor coupled between the third diode and the negative power supply terminals, a sixth transistor having emitter, base, and collector, the collector of the sixth transistor being directly coupled to the positive power supply terminal, the base of the sixth transistor being directly coupled to the collectors of the third and fifth transistors, the emitter of the sixth transistor being directly coupled to the output terminal, a seventh resistor connected between the emitter of the sixth transistor and the ground terminal, and an eighth resistor connected between the base of the third transistor and the ground terminal.

7. A variable gain control circuit having an input terminal, a positive power supply terminal, a negative power supply terminal, a ground terminal, an output terminal, a first transistor having emitter, base, and collector, the collector of the first transistor being directly coupled to the negative power supply terminal, the base of the first transistor being coupled through a first resistor to the negative power supply terminal, through a second resistor to the ground terminal, and through a first capacitor to the input terminal, and the emitter of the first transistor being coupled to a third resistor, second and third transistors each having an emitter, base, and collector, the emitter of the second transistor being coupled through a first diode to the third resistor, the emitter of the third transistor being coupled through a second diode to the third resistor, the collector of the second transistor being coupled through a fourth resistor to the positive power supply terminal, the collector of the third transistor being coupled through a fifth resistor and a first inductor in series to the positive power supply terminal, the base of the second transistor being coupled through a sixth resistor to the wiper of a first variable resistor coupled between the positive and negative power supply terminals, the base of the third transistor being coupled through a seventh resistor to ground, fourth and fifth transistors each having emitter, base, and collector, the collector of the fourth transistor being coupled to the collector of the second transistor, the collector of the fifth transistor being coupled to the collector of the third transistor, the base of the fourth transistor being coupled through an eighth resistor to ground and through a ninth resistor to the wiper of a second variable resistor coupled between the positive and negative power supply terminals, the base of the fifth transistor being directly coupled to the wiper of the first variable resistor, a third diode coupled to the emitter of the fourth transistor, a fourth diode coupled to the emitter of the fifth transistor, a second inductor coupled between the third and fourth diodes, a tenth resistor coupled between the junction point of the second inductor and the third diode and the negative power supply terminal, a sixth transistor having emitter, base, and collector, the collector of the sixth transistor being directly coupled to the positive power supply terminal, the emitter of the sixth transistor being directly coupled to the output terminal and the base of the sixth transistor being directly coupled to the collectors of the third and fifth transistors, a second capacitor coupled to the output terminal, and the parallel combination of an eleventh resistor with a third capacitor and twelfth resistor in series coupled between the second capacitor and the base of the second transistor.

References Cited

UNITED STATES PATENTS

| | | | |
|---|---|---|---|
| 2,994,044 | 7/1961 | Straube | 332—31 X |
| 3,219,931 | 11/1965 | Lennon et al. | 332—44 X |
| 3,239,780 | 3/1966 | Echarti | 332—38 |
| 3,242,443 | 3/1966 | Massaro | 332—31 |

ROY LAKE, *Primary Examiner.*

ALFRED L. BRODY, *Examiner.*